(12) United States Patent
Hartmann et al.

(10) Patent No.: US 6,633,146 B2
(45) Date of Patent: Oct. 14, 2003

(54) BRAKING DEVICE FOR ELECTRICAL TOOL

(75) Inventors: Markus Hartmann, Mauerstetten (DE); Günter Haas, Kaufering (DE); Andreas Dieterle, Wessling (DE)

(73) Assignee: Hilti Aktiengesellschaft, Schaan (LI)

( * ) Notice: Subject to any disclaimer, the term of this patent is extended or adjusted under 35 U.S.C. 154(b) by 9 days.

(21) Appl. No.: 09/928,778

(22) Filed: Aug. 13, 2001

(65) Prior Publication Data

US 2002/0024311 A1 Feb. 28, 2002

(30) Foreign Application Priority Data

Aug. 17, 2000 (DE) .......................... 100 40 329

(51) Int. Cl.⁷ .............................. H02K 7/102
(52) U.S. Cl. ...................................... 318/372
(58) Field of Search ........................ 318/370, 371, 318/372

(56) References Cited

U.S. PATENT DOCUMENTS

| | | | | |
|---|---|---|---|---|
| 2,539,191 A | * | 1/1951 | Hoffmann | |
| 3,760,570 A | * | 9/1973 | Ehrlich et al. | |
| 3,866,722 A | * | 2/1975 | Kjos | |
| 4,323,324 A | * | 4/1982 | Eberhardt | |
| 4,335,514 A | * | 6/1982 | Overy et al. | |
| 4,376,396 A | * | 3/1983 | Hayhoe | |
| 4,480,205 A | * | 10/1984 | Nymann | |
| 4,664,232 A | * | 5/1987 | Takagi et al. | |
| 4,909,114 A | * | 3/1990 | Astle | |
| 5,480,009 A | * | 1/1996 | Wieland et al. | |

* cited by examiner

Primary Examiner—Bentsu Ro
(74) Attorney, Agent, or Firm—Sidley Austin Brown & Wood, LLP

(57) ABSTRACT

A braking device for an electrical tool and including an actuation member (1), a braking drum (4) secured on the shaft of the electrical tool for joint rotation therewith, and a braking member (5) secured on the actuation member for joint displacement therewith, the actuation member being linearly displaceable upon a biasing force of a return spring acting thereon for pressing the braking member against a circumferential surface of the braking drum for braking the shaft and thereby the working tool.

8 Claims, 1 Drawing Sheet

BRAKING DEVICE FOR ELECTRICAL TOOL

BACKGROUND OF THE INVENTION

1. Field of the Invention

The present invention relates to a braking device for an electrical tool including an electric motor and a shaft for transmitting torque from the electric motor to a working tool, with the braking device including an actuation member, a braking drum secured on the shaft for joint rotation therewith, and a braking member for engaging the braking drum and secured on the actuation member for joint displacement therewith.

2. Description of the Prior Act

When operating at a very high speed, the electrical tools have a tendency to run out. This is dangerous for both the electrical tool user and the electrical tool itself. This can be prevented by rapidly braking the working tool before the user puts the electrical tool aside or can reach the vicinity of the working tool.

An electrical tool of the above-described type is disclosed in German Publication DE-A-4007030. The known electrical tool includes an electric motor, which is actuated with a switch, a shaft that transmits torque from the motor to a working tool, and a mechanical braking device for braking the working tool. The braking device has an actuation member, which is spring-biased with a return spring, and a safety element displaceable between a safety, braking position and a release position. In addition, the braking device includes a braking drum secured on the shaft and a braking member secured on the actuation member. The actuation member is so connected with the safety element that in the release position of the safety element, the braking device is non-operative and in the safety position of the safety element, the braking device is in its operating position. The electric motor switch can be operated only in the release position of the safety element, and in the safety position of the safety element, the switch is blocked to prevent operation of the motor when the braking device is its operational position. The braking member, which is connected with the safety element by the actuation member, is pivotally secured on the motor with a bolt. In its safety position, the safety element presses the braking member against the braking drum secured on the shaft. The friction between the braking member and the braking drum brakes the shaft and thereby the working tool. When the safety element is displaced into its release position, the braking member pivots away from the braking drum, and the braking device is also released. The electric tool user cannot actuate the motor and, thereby, the working tool in the safety position of the safety element. The working tool can be actuated or deactuated only upon appropriate actuation of the motor switch. E.i., the electric tool can be controlled, during the operational process, only with the motor switch.

The drawback of the known tool consists in a rather complicated construction of the pivot mechanism and, as a result, in increased manufacturing costs. Moreover, the entire braking force acts on the pivot mechanism, e.g., on a single bolt.

Further, in order to keep the slow-down time small in each speed region of the electrical tool, a high press-on force needs to be applied to the braking member. As a result, the user has to apply a significant effort in order to actuate the safety element which generally makes the handling of the tool more difficult.

Accordingly, an object of the present invention is to provide reliable braking means for an electrical tool and which is characterized by easy handling.

Another object of the present invention, is to provide reliable braking means for an electrical tool and which can be economically manufactured.

SUMMARY OF THE INVENTION

These and other objects of the present invention, which will become apparent hereinafter, are achieved by providing an electrical tool with a braking device in which the actuation member is linearly displaceable upon a biasing force of a return spring acting thereon, for pressing the braking member against a circumferential surface of the braking drum for braking the shaft and thereby the working tool.

Under the circumferential surface is understood a surface of the outer profile of the braking drum which is substantially coaxial with the shaft. The braking drum is formed as a body without any unbalance.

Because the braking member is displaced substantially linearly toward the braking drum, an expensive pivot mechanism can be dispensed with. The braking member is displaced linearly, i.e., without any rotational movement. Moreover, rather expensive in manufacturing, guide means for the actuation member such as, e.g., a set of hinges, becomes unnecessary. Accordingly, the present invention provides reliable and easily manufactured braking means.

In order to be able to use the kinetic energy of the shaft for increasing the braking effect, the operational direction of the braking member is offset with respect to the feed direction of the actuation member in the rotational direction of the shaft by angle that amounts at most to 90°. Therefore, the actuation force which the user needs to apply can be reduced because at the same slow-down time, which depends on the rotational speed of the electrical tool and its construction, the biasing force can be reduced. This is because the available kinetic energy increases or decreases with increase and decrease of the rotational speed, respectively. The operational direction of the braking member is defined by a normal or a perpendicular to the braking surface of the braking member. Because the offset angle is generally less than 90°, the so-called wedge effect kicks-in. Upon actuation of the braking device, friction is generated between the braking member, in particular, its braking surface and the braking drum. The shaft torque and the displacement of the actuation member in its feed direction lead to the displacement of the braking member against the braking drum. The wedge-shaped arrangement of the braking member permits to amplify or reinforce the force acting on the braking member in its operational direction. As a result, the entire force required for braking the tool need not be produced by the return spring. The applied force need be sufficiently high so that, upon being reinforced, it produce a required braking effect.

For an optimal reinforcement, the offset angle is advantageously selected in a range from 5° to 45°.

Advantageously, the actuation member has a plurality of elongate slots extending in the feed direction of the actuation member, and a corresponding plurality of bosses engage in respective elongate slots for guiding the actuation member in its displacement.

The foregoing means permits to provide cost-effective in manufacturing, guide means for guiding the actuation member, together with the braking member, in the feed direction. Dependent on the range of the rotational speeds of the electrical tool, one or more elongate slots and engageable therein bosses can be provided. Advantageously, the bosses are secured on the tool housing or the motor.

Advantageously, the actuation member is formed as a one-piece member which insure a stable guidance of the actuation member. In addition, this feature increases the service life of the electrical tool, in particular, the service life of the braking device, and insures simple and rapid mounting of the braking device during its assembly in the electrical tool.

Advantageously, the actuation member is formed of a plastic material as this material can be easily treated. However, in special cases, to meet particular requirements, other material can be used, e.g., metal. A plastic actuation member is advantageously produced by injection-molding.

To provide for an adequate stability and compactness, the actuation member at least partially circumferentially surrounds the shaft.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
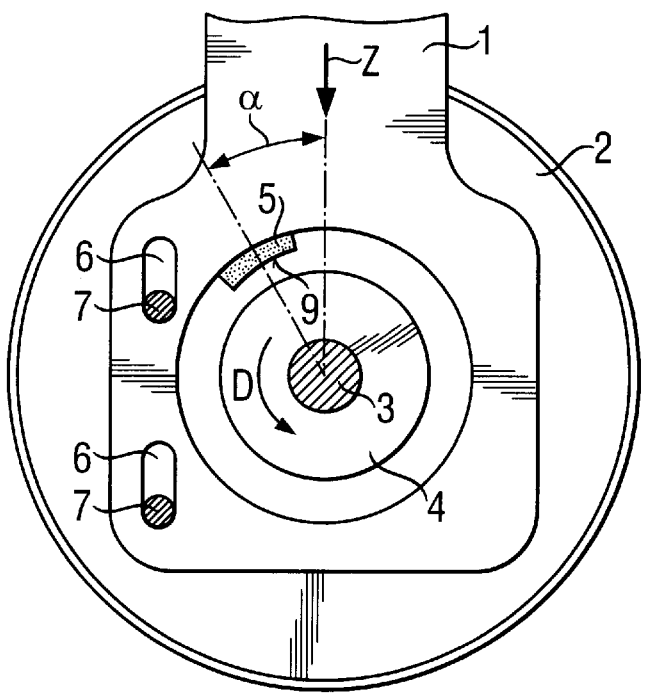
FIG. 1 a front, partial view of a braking device according to the present invention in a release position thereof.
Figure 2:
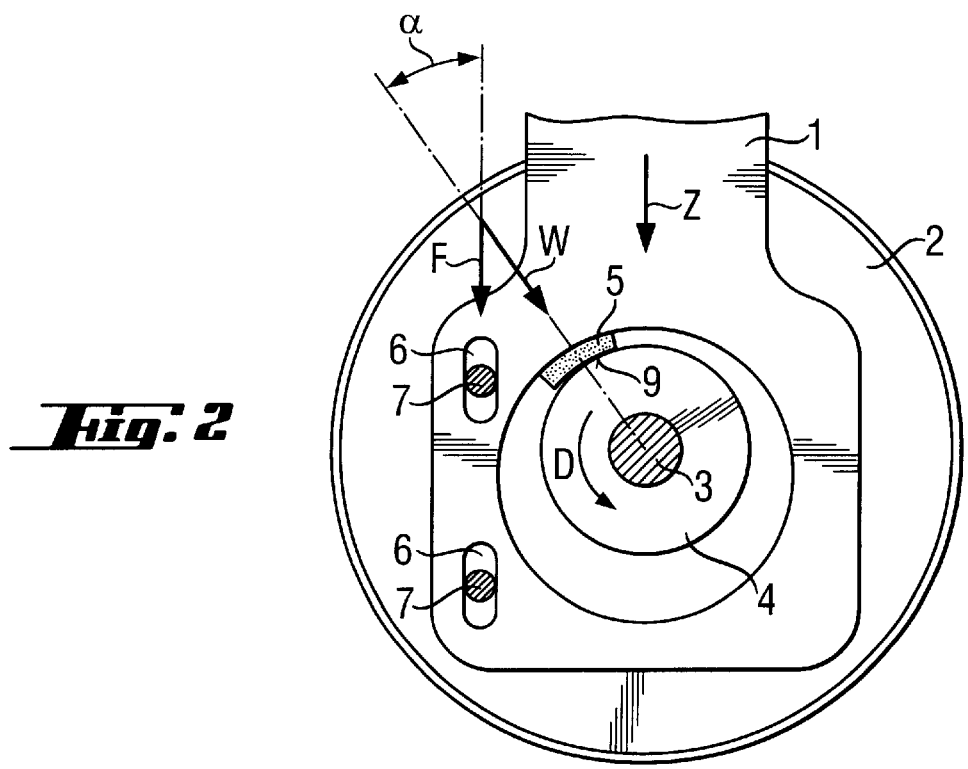
FIG. 2 a view similar to that of FIG. 1 showing the braking device in an actuated position thereof.

A braking device according to the present invention for an electrical tool, in particular for a circular saw, which is shown in FIGS. 1–2, includes an actuation member 1 to which a braking member 5 is secured. The braking member 5 cooperates with a braking drum 4 secured on a shaft 3. The shaft 3 serves for transmitting torque from a motor 2 to a tool, e.g., a saw disc (not shown).

For displacement in the feed direction Z, the actuation member 1 is provided with several, in particular, two, extending in the feed direction, elongate slots 6 in which bosses 7, which are secured on the motor 2, engage. In the braking position, the braking member 5 and the braking drum 4 contact each other in the region of the braking surface 9 provided on the braking member 5. A perpendicular to the braking surface 9 that passes through the center of gravity of the braking member 5 defines an operational direction W offset with respect to the feed direction Z in the rotational direction D of the shaft 3 by an angle α, as particularly shown in FIG. 2.

For displacement of the braking device in its release position shown in FIG. 1, the actuation member 1 is displaced in a direction opposite to the feed direction Z against a biasing force F of a return spring (not shown). The displacement of the actuation member 1 in the release position of the braking device causes a radial displacement of the braking member 5 away from the braking drum 4 and the shaft 3. Upon the release of a safety element (not shown), the actuation member 1, together with the braking member 5, move again into the braking position shown in FIG. 2. The return spring biases the actuation member 1 and, in particular, the braking member 5 in the feed direction Z in direction toward the shaft 3. When the braking member 5 contacts the braking drum 4, friction is generated therebetween. If the shaft 3 rotates in the direction D, it would be braked by a friction force. The braking action is amplified as a result of the operational direction W being offset with respect to the feed direction. The amplification of the braking action increases the force acting on the braking member 5 in its operational direction W and thereby decreases or shortens the response time of the braking device.

Though the present invention was shown and described with references to the preferred embodiment, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiment within the spirit and scope of the present invention as defined by the appended claims.

What is claimed is:

1. A braking device for an electrical tool including an electric motor and a shaft (3) for transmitting torque from the electric motor to a working tool, the braking device comprising a manually operated actuation member (1); a braking drum (4) secured on the shaft for joint rotation therewith, and a braking member (5) secured on the actuation member for joint displacement therewith, the actuation member being linearly displaceable upon a biasing force of a return spring acting thereon for pressing the braking member against a circumferential surface of the braking drum for braking the shaft and thereby the working tool.

2. A braking device according to claim 1, wherein an operational direction of the braking member (5) is offset with respect to a feed direction (Z) of the actuation member (1) in a rotational direction (D) of the shaft (3) by an angle (α) that amounts to at most 90°.

3. A braking device according to claim 2, wherein the offset angle (α) amounts from 5° to 45°.

4. A braking device according to claim 1, wherein the actuation member (1) is formed as a one-piece member.

5. A braking device according to claim 1, wherein the actuation member (1) is formed of a plastic material.

6. A braking device according to claim 1, wherein the actuation member (1) at least partially circumferentially surrounds the shaft.

7. An electrical tool, comprising an electric motor; a shaft for transmitting torque to a working tool; and a braking device for braking the shaft and thereby the working tool, the braking device comprising a manually operated actuation member (1), a braking drum (4) secured on the shaft for joint rotation therewith and a braking member (5) secured on the actuation member for joint displacement therewith, the actuation member being linearly displaceable upon a biasing force of a return spring acting thereon for pressing the braking member against a circumferential surface of the braking drum for braking the shaft and thereby the working tool.

8. A braking device for an electrical tool including an electric motor and a shaft (3) for transmitting torque from the electric motor to a working tool, the braking device comprising an actuation member (1); a braking drum (4) secured on the shaft for joint rotation therewith; and a breaking member (5) secured on the actuation member (1) for joint displacement therewith, the actuation member (1) being linearly displaceable upon a biasing force of a return spring acting thereon for pressing the braking member against a circumferential surface of the braking drum for braking the shaft and thereby the working tool, wherein an operational direction of the braking member (5) is offset with respect to a feed direction (Z) of the actuation member (1) in a rotational direction (D) of the shaft (3) by an angle ($\alpha$) that amounts to at most 90°, and wherein the actuation member (1) has a plurality of elongate slots (6) extending in the feed direction (Z) of the actuation member, and a corresponding plurality of bosses (7) engaging in respective elongate slots (6) for guiding the actuation member.

* * * * *